United States Patent [19]

Struck

[11] Patent Number: 5,076,610
[45] Date of Patent: Dec. 31, 1991

[54] INERTIA SENSOR FOR THE VEHICLE SENSITIVE ACTUATION OF LOCKING DEVICES OF SAFETY BELTS

[75] Inventor: Klaus Struck, Hamburg, Fed. Rep. of Germany

[73] Assignee: Autoflug GmbH & Co. Fahrzeugtechnik, Rellingen, Fed. Rep. of Germany

[21] Appl. No.: 654,649
[22] PCT Filed: Jun. 9, 1990
[86] PCT No.: PCT/DE90/00441
§ 371 Date: Feb. 8, 1991
§ 102(e) Date: Feb. 8, 1991
[87] PCT Pub. No.: WO90/15733
PCT Pub. Date: Dec. 27, 1990

[30] Foreign Application Priority Data

Jun. 13, 1989 [DE] Fed. Rep. of Germany ....... 3919218

[51] Int. Cl.$^5$ .............................................. B60R 22/36
[52] U.S. Cl. .................................... 280/806; 280/807; 280/805
[58] Field of Search ....................... 280/806, 807, 805; 242/107.4 A; 297/480, 476

[56] References Cited

U.S. PATENT DOCUMENTS 4,120,466 10/1978 Adomeit ............................ 280/806
4,412,691 11/1983 Murphy et al. .............. 242/107.4 A

FOREIGN PATENT DOCUMENTS

| 0055389 | 7/1982 | European Pat. Off. ............ 280/806 |
| 3624569 | 2/1987 | Fed. Rep. of Germany ...... 280/806 |
| 3829694 | 3/1990 | Fed. Rep. of Germany ...... 280/806 |
| 2084000 | 4/1982 | United Kingdom ........ 242/107.4 A |
| 2208264 | 3/1989 | United Kingdom ................ 280/806 |

Primary Examiner—Kenneth R. Rice
Assistant Examiner—M. Shaughnessy
Attorney, Agent, or Firm—Robert W. Becker & Associates

[57] ABSTRACT

In a vehicle sensitive inertia sensor for controlling a locking device of a safety belt arrangement, especially in motor vehicles, with an inertia element, the deflection of which from its inoperative position via a transversely deflectable tensile component acts on an appropriate movable lever of the locking device and initiates its locking operation, in which the tensile component is secured at one end to the movable lever and at the othe end to the housing of the locking device, the production and fitting of the inertia sensor are to be simplified. The inertia element is supported by its own weight on the movable lever of the locking device, and the tensile component consists of a flexible guide and retaining member passing through a central bore in the inertia element.

8 Claims, 4 Drawing Sheets

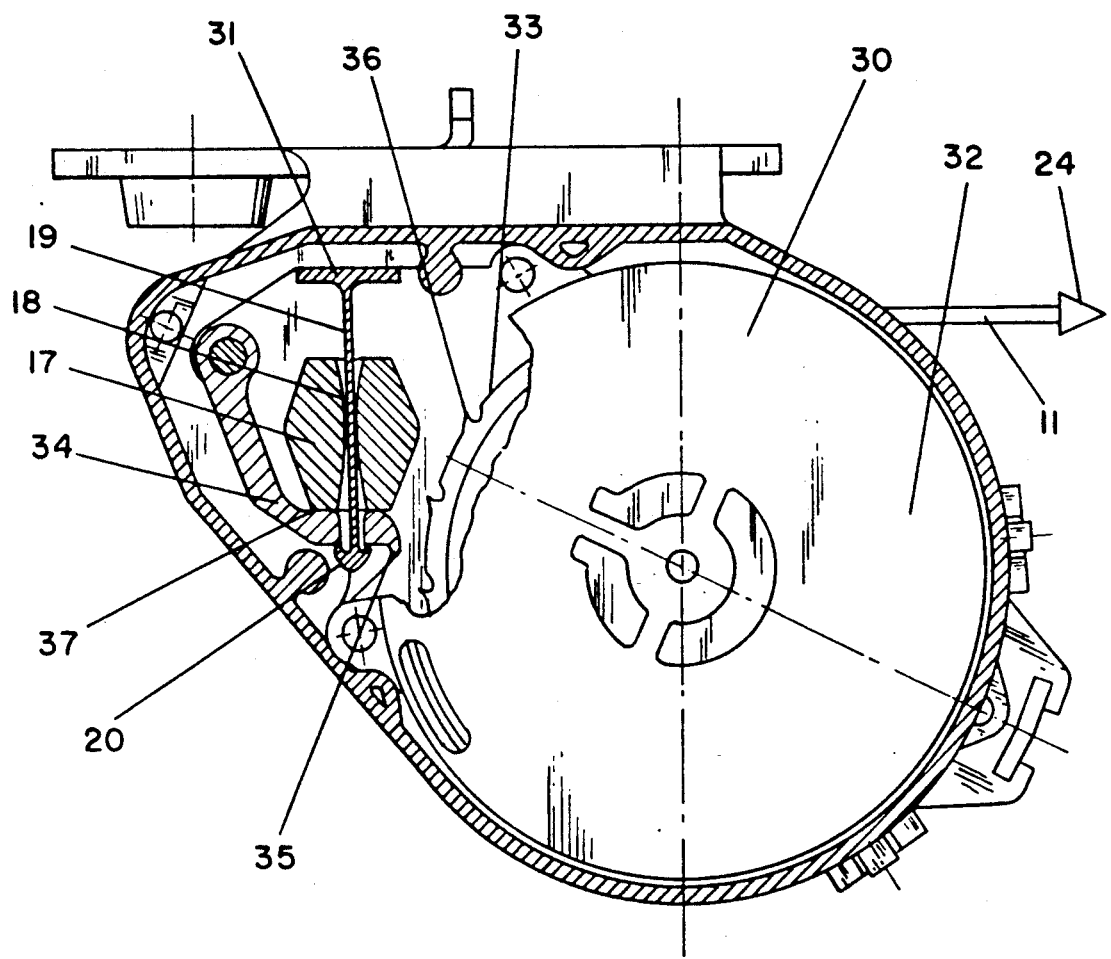
FIG — 5

INERTIA SENSOR FOR THE VEHICLE SENSITIVE ACTUATION OF LOCKING DEVICES OF SAFETY BELTS

BACKGROUND OF THE INVENTION

The invention relates to a vehicle sensitive inertia sensor for the vehicle sensitive actuation of a locking device of a safety belt arrangement, especially in motor vehicles, having an inertia component, the deviation of which from its resting position acts via a tensile component that is movable in a transverse direction onto a respective movable lever of a locking device thus initiating the locking function, whereby the tensile component is connected with one end to the movable lever and with the other end to the housing of the locking device.

A vehicle sensitive inertia sensor of the aforementioned kind has been described in DE 36 24 569 A1; in this known device, the inertia sensor in the form of a pendulum mass is suspended between two connecting rods such that it is movable in a transverse direction, whereby one of the connecting rods is positioned between a suspension fixed at the housing and the pendulum mass and the other connecting rod is positioned between the pendulum mass and a transmission component connected to the moveable lever of the locking device. When accelerations or decelerations occur, the inertia element is shifted and thus shortens, via the deflection of the connecting rods, the distance between their suspension points, so that, via the actuation of the transmission component, the locking function of the movable lever of the locking device is initiated.

The known inertia sensor has the disadvantage, that the pendulum mass is disposed in a free floating manner between the connecting rods, requiring a secure connection between their connecting rods and the pendulum mass. Also, in various places, movable connections between the suspension points and the connecting rods as well as the connecting rods and the pendulum masses must be provided, and for this reason it is difficult to produce the known inertia sensor as well as to adjust it properly during assembly.

It is therefore an object of the present invention to provide an inertia sensor of the aforementioned kind, the production and mounting of which is simplified and the function and operation of which is improved.

SUMMARY OF THE INVENTION

The solution to this object, including advantageous embodiments, is given in the claims attached to the description.

The invention is based on the idea, that the inertia element, with its own weight, is resting on the movable lever of the locking device and that the tensile component is embodied as a flexible guide and retaining member, which is guided through a central bore of the inertia element.

The invention is advantageous in that a special housing, respectively elaborate suspension means, for the inertia element is eliminated and a direct connection of the inertia element to the respective movable levers of the locking device that are to be actuated is provided.

According to the embodiments of the invention, the flexible guide and retaining member may comprise a spring suspended between the housing and the moveable lever or a flexible wire.

When, according to an embodiment of the invention, a thread is provided as the guide and retaining member, it is advantageous to form the thread as an injection molded plastic part provided at its ends with fastening elements for positioning the thread at the housing of the locking device, on the one hand, and the moveable lever that is to be actuated, on the other hand. It is also possible to embody the thread as an integral part of the plastic housing cover or as an integral part of the moveable lever arrangement which may also be formed from plastic. In this embodiment, the thread is only provided at its free end with a fastening element for connecting it to the respective other component. In this context, it is advantageous to produce the lever arrangement of the locking device in a manufacturing process which allows to form the thread as an integral part of the lever arrangement or at least allows for the provision of receiving elements for the thread, such manufacturing processes including, for example, injection molding, die casting, or extrusion.

A further embodiment provides for the utilization of an inertia sensor of the present invention in a clamping device, the function and embodiment of which is described in detail in DE-OS 36 24 569. According to the present invention, the movable lever, on which the inertia sensor is resting with its own weight, is provided in the form of a clamping jaw of the safety belt clamping device.

The use of the inertia sensor of the present invention for the actuation of the moveable clamping jaw provides the advantage, that a spring for loading the moveable clamping jaw into its clamping position is obsolete. Also, an automatic repositioning of the clamping device occurs, because the inertia element, in its non-deflected resting position, is resting with its own weight on the movable clamping jaw thus forcing it into its resting position. Only when a deflection of the clamping jaw occurs, does the inertia sensor pull the clamping jaw via an actuating member in the direction of an abutment at the safety belt. After the engagement of the moveable clamping jaw at the safety belt, the clamping effect of the clamping device is further increased due to the obvious kinetics that occur. Thus it is ensured, that previous to the occurrence of safety belt pull due to the forward shift of a buckled in passenger the moveable clamping jaw is already in frictional engagement at the safety belt so that with increasing load only the clamping jaw stroke effects a safety belt movement. Furthermore, due to the advantageous simple design of the clamping device fewer components are employed, the manufacture is facilitated, and the assembly of the device is simplified.

In a further embodiment of the present invention, the inertia sensor is used in connection with a self-locking safety belt reeling device having at least one vehicle-sensitive locking device, the basic operating principal of which is described, for example, in DE-GM 74 25 531. According to the invention, the inertia element is resting on the sensor lever and the guide and retaining member of the lever engages that lever, whereby a deflection of the inertia element effects a deflection of the lever until the lever engages an outer toothing of the respective control disk.

BRIEF DESCRIPTION OF THE DRAWINGS

In the drawings, embodiments of the invention are represented, in which:

FIG. 5 shows a cross section of a self-locking safety belt reeling device for a safety belt arrangement having an inertia sensor.

DESCRIPTION OF PREFERRED EMBODIMENTS

Figure 1:
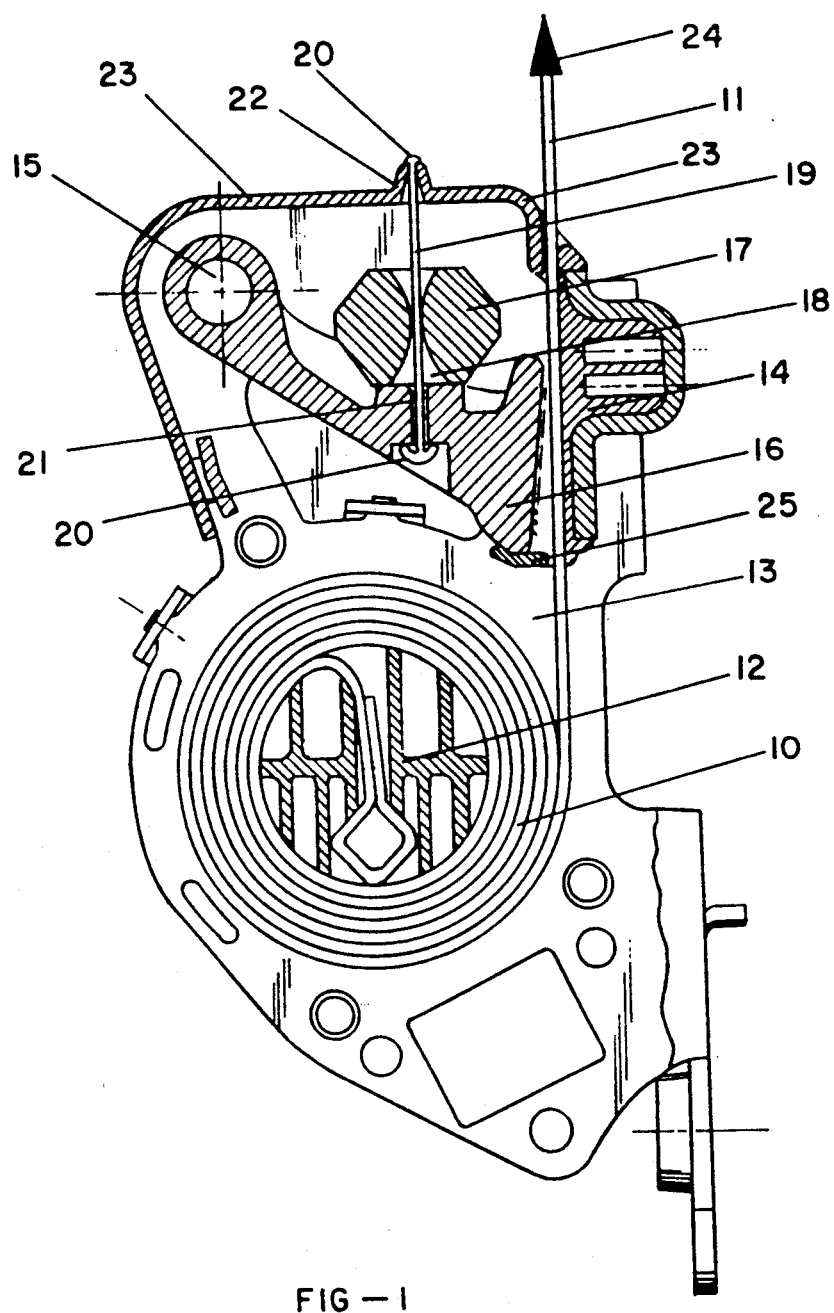
FIG. 1 is a sectional view of the safety belt arrangement in its resting position having a clamping device that is actuated via an inertia sensor.

A safety belt arrangement comprises a safety belt reeling device 10, onto which a safety belt 11 is reeled. A reeling shaft 12 is supported by a U-shaped housing 13, whereby that housing also supports a clamping device which is arranged above the safety belt reeling device. The clamping device comprises a stationary clamping jaw 14, which is fastened to the housing 13, and a further movable clamping jaw 16, which is rotatably supported at the shaft 15 disposed at the housing. The safety belt 11 which is unreeled from the safety belt reeling device 10 is guided between the movable clamping jaw 16 and the stationary clamping jaw 14, whereby the shaft 15 of the moveable clamping jaw 16 is arranged such that, in order to initiate the engagement in the clamping position the moveable clamping jaw 16 is pivoted upwardly in a direction away from the safety belt reeling device 10.

Above the moveable clamping jaw 16, the inertia element 17 is positioned, which is resting due to its own weight on the surface of the moveable clamping jaw 16 whereby the clamping jaw 16 is loaded against an abutment 25 in a predetermined open position. The inertia element 17 is held in its position via a thread 19 that is guided through a center bore 18 of the inertia element 17. The thread 19 is preferably formed from plastic material. The outer ends of the thread are provided with fastening elements 20, with which the thread 19 is fastened in a perforation 21 of the movable clamping jaw 16 on the one hand, and the receiving bore 22 of the housing cover 23, on the other hand, such that, in the resting position above the clamping device represented in FIG. 1, the thread is tightened without play between the fastening elements 20, 21, 22.

Figure 2:
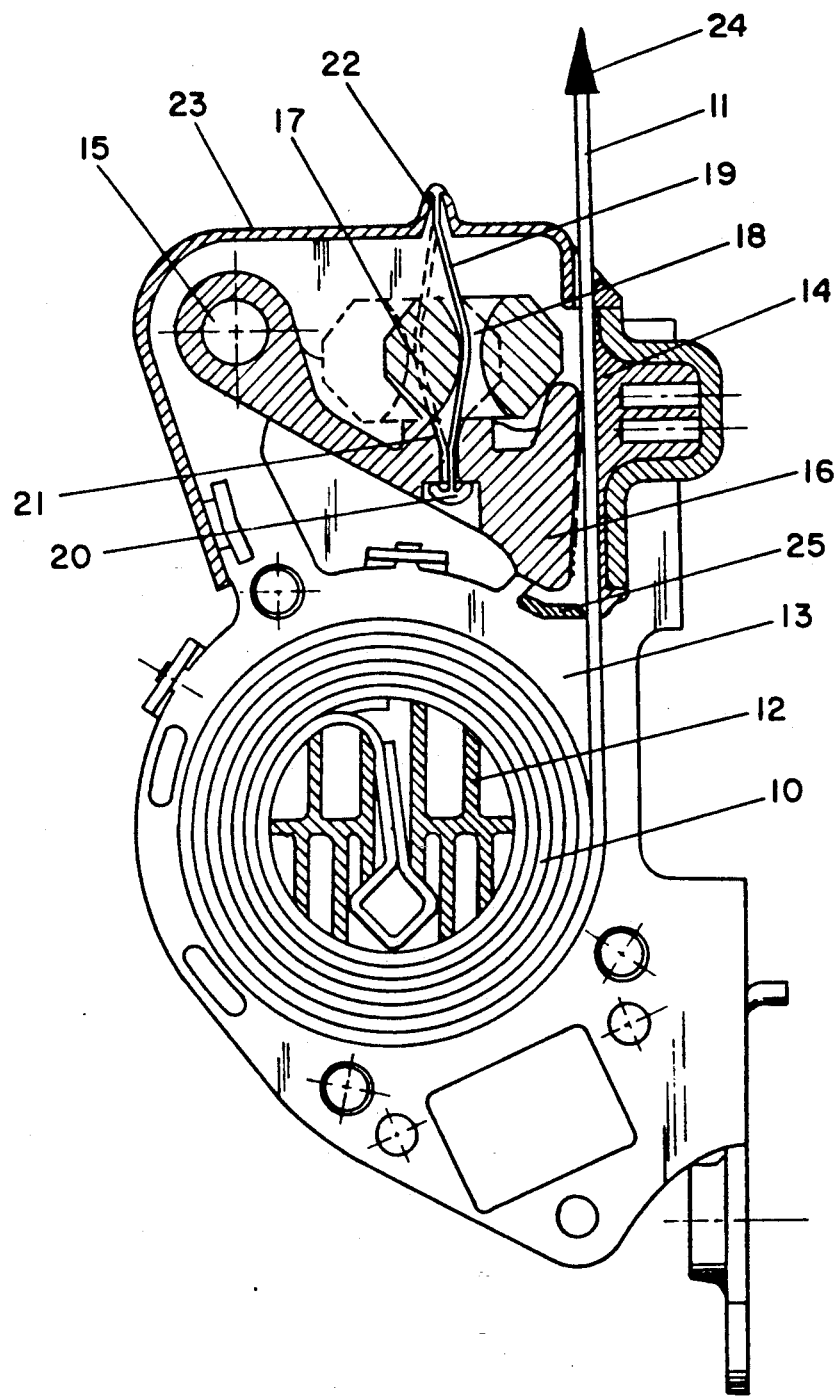
FIG. 2 shows the arrangement of FIG. 1 in its clamping position.

The clamping device, due to its special design, works as follows: During occurring accelerations or decelerations of the vehicle, a relative movement of the inertia element 17 with respect to the housing 13 results due to the known kinetics, whereby the threshold is depending on the mass of the inertia element and on the design of the contact surface between the inertia element and the movable clamping jaw, and is variable. When deflected, the inertia element 17 acts on the thread 19 due to its kinetic energy, as can be seen in FIG. 2. The deflection of the thread, which in its resting position, is tightened results in a decrease of the distance between the movable clamping jaw 16 and the housing cover 23, thus the moveable clamping jaw 16 is rotated in an upward direction about the shaft 15 resulting in a frictional engagement at the safety belt 11. The force resulting from the inertia element 17 is sufficient to lift the clamping jaw 16. In the abutment position shown in FIG. 2, the further safety belt movement in the direction of the arrow 24 causes a further pivoting action of the moveable clamping jaw 16 until it abuts at the stationary clamping jaw 14. Therefore, after the actuation of the inertia element 17, the clamping device releases at most a portion of the safety belt that corresponds to the stroke of the clamping jaw.

After the respective acceleration or deceleration effect ceases, the inertia element 17 that returns into its resting position causes the repositioning of the clamping jaws 16 into its resting position due to the weight load of the inertia element 17. Thus, without any further measures, the clamping device has again reached its operating position.

In the cooperation of the safety belt reeling device 10 with the clamping device, the function of the clamping device is usually adjusted such, that the response threshold for the clamping device is adjusted to a higher level as requested by legal regulations for self-locking safety belt reeling devices. Therefore, only after surpassing the "normal" response threshold, an actuation of the clamping device occurs. Due to this adjustment of the response threshold, premature damaging of the safety belt by the clamping device is prevented.

Figure 3:
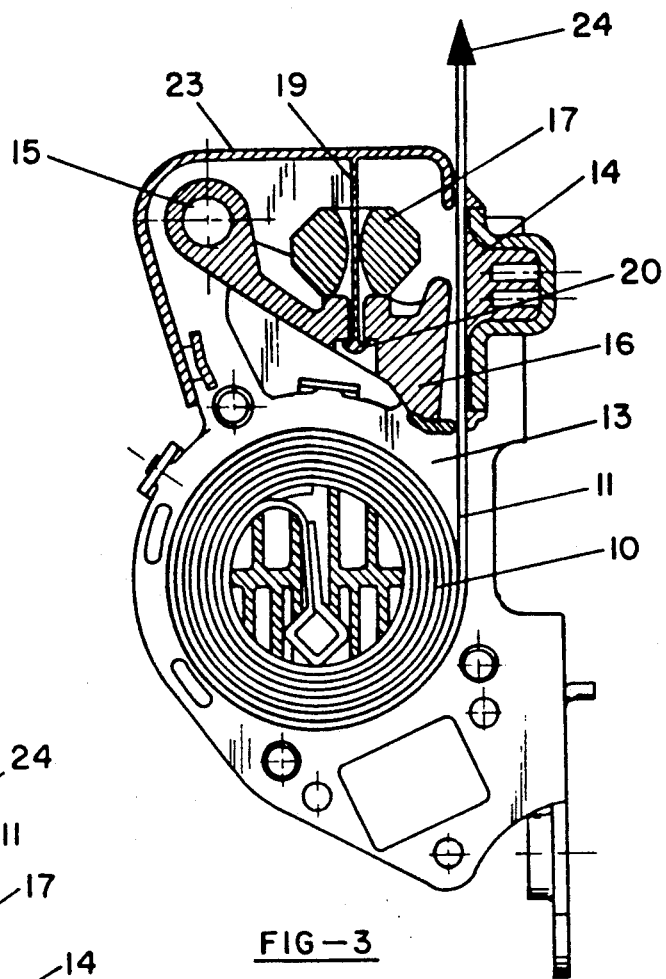
FIG. 3 and 4 represent different embodiments of the clamping device.
Figure 4:
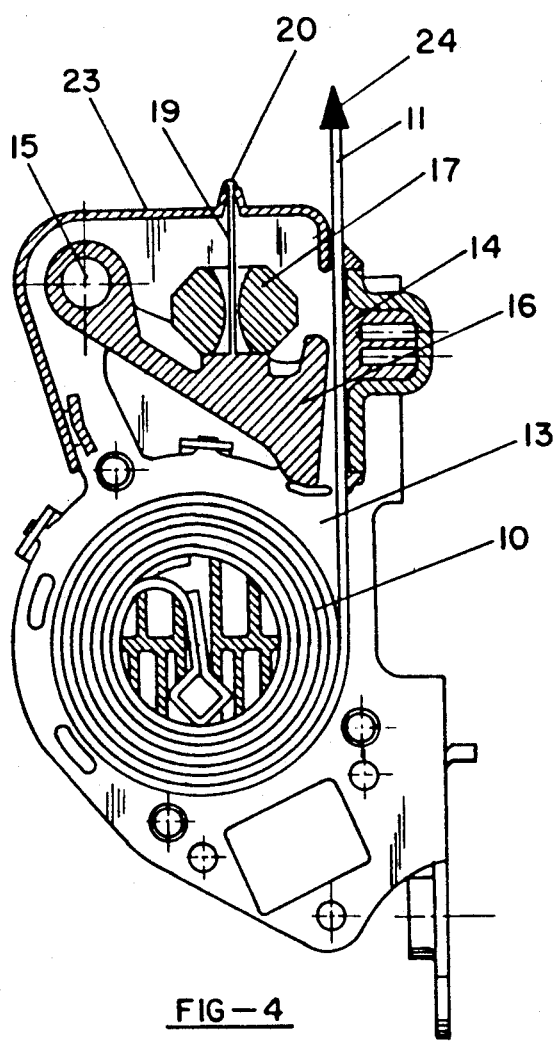

FIGS. 3 and 4 represent further embodiments of the present invention, in which the actuating member is in the form of a thread that may be shaped as an integral part of the housing cover 23 (FIG. 3) or an integral part of the moveable clamping jaw (FIG. 4), thus only having on its respective free end a fastening element 20 for abutting against the respective other component.

The embodiment represented in FIG. 5 shows a safety belt reeling device 30 having a housing 31. The locking device of the safety belt reeling device 30 is hidden under a cover 32. In the broken-away section of FIG. 5 the control disk 33 having an outer toothing may be seen. A sensor lever 34 is arranged in a moveable fashion such that, with its locking tip 35, it may engage the outer toothing 36 of the control disk 33 thereby effecting the locking of the safety belt reeling device, as is known in principle from DE-GM 14 25 531.

The actuation of the sensor lever 34 is achieved via the inertia element 17 which, with its own weight, is resting on the guiding surface 37 of the lever 34. The thread 19, in this embodiment, is fastened to the housing 31 of the safety belt reeling device 30. The thread 19 is guided through a center bore 18 of the inertia element 17 and is connected with a fastening element 20 to the lever 34. The function of the inertia sensor is the same as described above for the embodiments of the clamping device according to FIGS. 1 to 4.

The mounting of the safety belt reeling device has to be carried out such, that due to the gravity of the inertia element 17 a support on a guiding surface of the lever 34 occurs, whereby, in the representation according to FIG. 5, a mounting on the shelf behind the back seat of a motor vehicle is represented. In this case, the safety belt is guided in a lateral direction away from the safety belt reeling device. When a vertical unreeling of the safety belt is desired, the mounting of the safety belt reeling device is carried out such that the suspension of the lever 34 as well as the inertia elements 17 must be altered correspondingly.

The features as described and disclosed in the above specification, the claims, the abstract and the drawings may be important individually as well as in combination for the realization of the present invention and their various embodiments.

The present invention is, of course, in no way restricted to the specific disclosure of the specification and drawings, but also encompasses any modifications within the scope of the appended claims.

What I claim is:

1. In a vehicle-sensitive inertia sensor for the vehicle-sensitive actuation of a locking device of a safety belt arrangement having an inertia element, a deflection of which from a resting position thereof acts on a corresponding movable lever of said locking device via a tensile component that is movable in a transverse direction relative to a central axis thereof thus initiating a locking function, with said tensile component being connected with a first end thereof with said movable lever and with a second end thereof to a housing of said locking device, the improvement wherein:

said inertia element is resting with its own weight on said movable lever of said locking device; and said tensile component is in the form of a flexible guide and retaining member which is guided through a center bore of said inertia element.

2. An inertia sensor according to claim 1, in which said guide and retaining member is in the form of a threat that is suspended between said movable lever of said locking device and said housing thereof.

3. An inertia sensor according to claim 2, in which said thread, at ends thereof, is equipped with fastening elements for fastening said tensile element at said housing and said movable lever with said thread formed as an injection molded plastic part.

4. An inertia sensor according to claim 2, in which said thread on a first end thereof is equipped with a fastening element for fastening at said movable lever, with said thread formed as an injection molded plastic part as an integral part of said housing made from plastic.

5. An inertia sensor according to claim 2, in which said thread is provided, at a first end thereof, with a fastening element for fastening at said housing, with said thread formed as an injection molded plastic part as an integral part of said movable lever.

6. An inertia sensor according to claim 1, in which said guide and retaining member consists of a flexible wire suspended between said movable lever of said locking device and said housing.

7. An inertia sensor according to claim 1, in which said lever is formed as a clamping jaw of a safety belt clamping device.

8. An inertia sensor according to claim 1, in which said movable lever is provided in the form of a sensor having a tip corresponding to a control disk of a safety belt reeling device, with said control disk being provided with an outer toothing.

* * * * *